(12) United States Patent
Park et al.

(10) Patent No.: US 11,184,906 B1
(45) Date of Patent: Nov. 23, 2021

(54) SCHEDULING RESOURCES IN MASSIVE MU-MIMO WIRELESS NETWORKS

(71) Applicant: Sprint Spectrum LP, Overland Park, KS (US)

(72) Inventors: Justin Sungki Park, Ashburn, VA (US); Saied Kazeminejad, Ashburn, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 23 days.

(21) Appl. No.: 16/058,349

(22) Filed: Aug. 8, 2018

(51) Int. Cl.
*H04W 72/12* (2009.01)
*H04W 24/02* (2009.01)
*H04B 7/0452* (2017.01)

(52) U.S. Cl.
CPC ...... *H04W 72/1263* (2013.01); *H04B 7/0452* (2013.01); *H04W 24/02* (2013.01)

(58) Field of Classification Search
CPC .... H04L 47/27; H04W 28/06; H04W 72/121; H04W 72/1226; H04W 72/1231; H04W 72/1263; H04W 24/02; H04B 7/0452
See application file for complete search history.

(56) References Cited

U.S. PATENT DOCUMENTS

| | | | |
|---|---|---|---|
| 9,532,256 B2 | 12/2016 | Ariyavisitakul et al. | |
| 9,698,889 B2 | 7/2017 | Xue et al. | |
| 2007/0223422 A1* | 9/2007 | Kim | H04B 7/0452 370/334 |
| 2012/0093089 A1* | 4/2012 | Park | H04B 7/0417 370/328 |
| 2012/0120873 A1* | 5/2012 | Song | H04B 7/04 370/328 |
| 2015/0319747 A1* | 11/2015 | Chu | H04L 27/2602 370/330 |
| 2016/0345343 A1* | 11/2016 | Elsherif | H04W 72/1289 |
| 2017/0373737 A1 | 12/2017 | Liang et al. | |
| 2018/0234141 A1* | 8/2018 | Silverman | H04B 7/0452 |

OTHER PUBLICATIONS

Sur, Sanjib, et al. "Practical MU-MIMO user selection on 802.11 ac commodity networks." Proceedings of the 22nd Annual International Conference on Mobile Computing and Networking. 2016. (Year: 2016).*

* cited by examiner

*Primary Examiner* — Elton Williams

(57) ABSTRACT

Systems, methods, and processing nodes are configured to perform scheduling in a wireless network utilizing a multi-user multiple-input multiple-output (MU-MIMO) operating mode, by determining that a throughput indicator of a sector meets a threshold, and adjusting a time window during which a first one or more wireless devices are removed from a MU-MIMO group and a second one or more wireless devices are added to the MU-MIMO group. The first one or more wireless devices comprise any wireless device that has a throughput below a threshold, and the second one or more wireless devices comprise any wireless device that has not been in the MU-MIMO group for a predefined time period.

11 Claims, 6 Drawing Sheets

SCHEDULING RESOURCES IN MASSIVE MU-MIMO WIRELESS NETWORKS

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. Wireless networks may be configured to utilize a single-user multiple-in multiple-out (SU-MIMO) operating mode and/or a multi-user (MU-MIMO) mode. In the SU-MIMO operating mode, multiple data streams are directed towards individual wireless devices. In the MU-MIMO operating mode, the multiple data streams can be directed towards plural wireless devices that are selected to participate in the MU-MIMO operating mode based on the orthogonality of transmission, thereby maximizing resources. In a recent evolution of MU-MIMO technology, known as massive MU-MIMO or large-scale MIMO, an access node may utilize hundreds of antennae to simultaneously transmit each of a plurality of different data streams to a corresponding plurality of wireless devices. Massive MU-MIMO has been identified as one of the promising air interface technologies to address the massive capacity requirement required demanded by 5G networks. However, indiscriminately adding new wireless devices in a sector to a massive MU-MIMO data stream may compromise a throughput for the sector. Conversely, denying additional wireless devices access to a massive MIMO data stream can compromise a throughput for said additional wireless devices. Thus, there remain scheduling problems in existing wireless networks configured to utilize massive MU-MIMO.

Overview

Exemplary embodiments described herein include methods, systems, and processing nodes for scheduling resources in wireless networks configured to utilize massive MU-MIMO. An exemplary method for scheduling resources includes identifying a first subset of wireless devices in a sector that are utilizing the MU-MIMO operating mode, identifying a second subset of wireless devices in the sector that are not utilizing the MU-MIMO operating mode, determining that a first one or more wireless devices in the first subset of wireless devices have a resource usage below a first threshold, instructing the first one or more wireless devices in the first subset of wireless devices to stop utilizing the MU-MIMO operating mode, and instructing a second one or more wireless devices in the second subset of wireless devices to start utilizing the MU-MIMO operating mode.

An exemplary system for scheduling resources includes a processing node and a processor coupled to the processing node. The processor is configured to perform operations including obtaining a first resource usage of each of a first subset of wireless devices in a sector that are utilizing a MU-MIMO operating mode (i.e. in a MU-MIMO group), obtaining a second resource usage of each of a second subset of wireless devices in the sector that are not utilizing the MU-MIMO operating mode and, during a time window, switching one or more wireless devices from the first subset with one or more wireless devices from the second subset, based on a combination of the first and second resource usage.

An exemplary processing node for scheduling resources is configured to perform operations including determining that a throughput indicator of a sector meets a threshold, and increasing a time window during which a first one or more wireless devices are removed from a MU-MIMO group and a second one or more wireless devices are added to the MU-MIMO group. The first one or more wireless devices comprise any wireless device that has a throughput below a threshold, and the second one or more wireless devices comprise any wireless device that has not been in the MU-MIMO group for a predefined time period.

DETAILED DESCRIPTION

Figure 1:
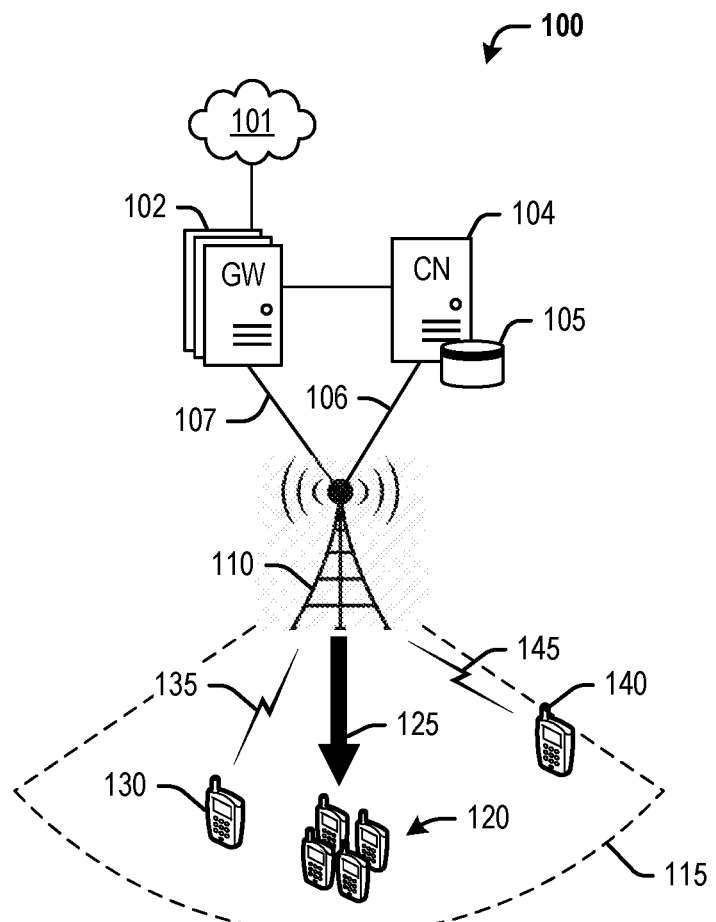
FIG. 1 depicts an exemplary system for scheduling resources in wireless networks configured to utilize massive MU-MIMO.

In embodiments disclosed herein, a method for scheduling resources in a wireless network configured to utilize a massive MU-MIMO operating mode includes identifying a first subset of wireless devices in a sector that are utilizing the MU-MIMO operating mode, identifying a second subset of wireless devices in the sector that are not utilizing the MU-MIMO operating mode, determining that a first one or more wireless devices in the first subset of wireless devices have a resource usage below a first threshold, instructing the first one or more wireless devices in the first subset of wireless devices to stop utilizing the MU-MIMO operating mode, and instructing a second one or more wireless devices in the second subset of wireless devices to start utilizing the MU-MIMO operating mode. Instructing the second one or more wireless devices to start utilizing the MU-MIMO operating mode further comprises determining that the second one or more wireless devices have not utilized the MU-MIMO operating mode for a time threshold. Alternatively or in addition, instructing the second one or more wireless devices to start utilizing the MU-MIMO operating mode further comprises determining that the second one or more wireless devices report a signal measurement higher than reported by other wireless devices in the second subset of wireless devices.

These identifying, determining, and instructing operations may be performed within a time period. The time period is configurable, in that it can be adjusted by an operator of the wireless network, or by an automated feedback mechanism. For example, the method includes adjusting the time period based on a throughput indicator of the sector. If the throughput indicator meets a threshold, the time period is increased and, if the throughput indicator does not meet the threshold, the time period is decreased. The throughput indicator comprises any metric that indicates that there are available resources in the sector, or that an available throughput of the sector is very good. For example, the throughput indicator comprises one or more of a total throughput, an available throughput, a resource usage, average bandwidth consumption, or any other key performance indicator (KPI). Thus, when the throughput indicator reveals that the throughput is good (by, for example, meeting a threshold), the time period for removing certain wireless devices from a MU-MIMO group and adding new wireless devices to the MU-MIMO group is increased. In this way, more wireless devices can take advantage of the higher downlink speeds provided by MU-MIMO.

Further, the method can include identifying a third subset of wireless devices in the sector that are newly added to the sector and not utilizing the MU-MIMO operating mode. Newly added devices are those that have just entered the sector from an adjacent sector (deployed by the same access node or a different access node), or those wireless devices that have been recently registered with the wireless network or resuming from an idle state. One or more of these new wireless devices are instructed to start utilizing the MU-MIMO operating mode. The one or more wireless devices may be selected based on factors including but not limited to a reference signal measurement, a location, a throughput requirement, etc. Further, addition of the one or more wireless devices from the third subset (i.e. the new wireless devices) into the MU-MIMO group may be alternated with the one or more wireless devices from the second subset (i.e. those wireless devices that have not utilized MU-MIMO for a threshold time), during the time period mentioned above.

As an additional scheduling mechanism, the resources allocated towards the MU-MIMO group (i.e. wireless devices utilizing the MU-MIMO operating mode) can be balanced with a number of wireless devices that are not currently within the MU-MIMO group. For example, a percentage of total resources of the sector may be allocated towards wireless devices utilizing the MU-MIMO operating mode. The method further comprises monitoring a number of wireless devices in the second subset (i.e. wireless devices not utilizing the MU-MIMO operating mode) and, upon determining an increase in the number of wireless devices in the second subset, reducing the percentage of total resources allocated towards the MU-MIMO group. Upon determining a decrease in the number of wireless devices in the second subset, the percentage may be increased. Further, the resources described herein may be physical resource blocks (PRBs) within one or more subframes of a radio-air interface deployed by an access node. For example, a subframe can comprise a plurality of PRBs allocated for control information (e.g. within a control channel) and for data transmission (e.g. within a data channel).

In another exemplary embodiment, a system for scheduling resources in a wireless network configured to utilize a multi-user multiple-input multiple-output (MU-MIMO) operating mode includes a processing node and a processor coupled to the processing node. The processor is configured to perform operations including obtaining a first resource usage of each of a first subset of wireless devices in a sector that are utilizing a MU-MIMO operating mode (i.e. in a MU-MIMO group), obtaining a second resource usage of each of a second subset of wireless devices in the sector that are not utilizing the MU-MIMO operating mode and, during a time window, switching one or more wireless devices from the first subset with one or more wireless devices from the second subset, based on a combination of the first and second resource usage. For example, the first resource usage of each of the first subset of wireless devices comprises a throughput of said each of the first subset of wireless devices. In this example, switching the wireless devices further includes determining that the one or more wireless devices in the first subset have a throughput below a threshold throughput, and instructing the one or more wireless devices in the first subset to stop utilizing the MU-MIMO operating mode. The throughput may be based on a PRB usage, an application requirement, or any other metric associated with a resource usage of the one or more wireless devices in the first subset. Further, the second resource usage of each of the second subset of wireless devices (i.e. wireless devices not in the MU-MIMO group) comprises a period of time during which said each of the second subset of wireless devices has not utilized the MU-MIMO operating mode. In this example, the switching further includes determining that the period of time associated with the one or more wireless devices in the second subset (that is, the period of time during which said one or more wireless devices have not been in the MU-MIMO group) meets a threshold period of time, and instructing the one or more wireless devices in the second subset to start utilizing the MU-MIMO operating mode. Further, said one or more wireless devices may be instructed to start utilizing the MU-MIMO operating mode based on determining that said one or more wireless devices report a signal measurement higher than reported by other wireless devices in the second subset of wireless devices.

As described above, the time window may be adjusted based on a throughput indicator of the sector. If the throughput indicator meets a threshold, the time window is increased and, if the throughput indicator does not meet the threshold, the time window is decreased. The throughput indicator comprises any metric that indicates that there are available resources in the sector, or that an available throughput of the sector is very good. For example, the throughput indicator comprises one or more of a total throughput, an available throughput, a resource usage, average bandwidth consumption, or any other key performance indicator (KPI). Thus, when the throughput indicator reveals that the throughput is good (by, for example, meeting a threshold), the time period for removing certain wireless devices from a MU-MIMO group and adding new wireless devices to the MU-MIMO group is increased. In this way, more wireless devices can take advantage of the higher downlink speeds provided by MU-MIMO.

In another exemplary embodiment, a processing node for scheduling resources in a wireless network configured to utilize a multi-user multiple-input multiple-output (MU-MIMO) operating mode is configured to perform operations including determining that a throughput indicator of a sector meets a threshold, and increasing a time window during which a first one or more wireless devices are removed from a MU-MIMO group and a second one or more wireless devices are added to the MU-MIMO group. The first one or more wireless devices comprise any wireless device that has a throughput below a threshold, and the second one or more wireless devices comprise any wireless device that has not been in the MU-MIMO group for a predefined time period. In this embodiment, the operations further comprise determining that the throughput indicator is below the threshold, and decreasing the time window. Further, the time window may be one of a plurality of time windows. In other words, the time window for removing wireless devices from and adding wireless devices to the MU-MIMO group is repeated on a periodic basis, or as needed. In this case, the operations further comprise monitoring the throughput indicator during an interval in between each time window of the plurality of time windows. Further, one or more new wireless devices may be added to the MU-MIMO group during the time window. In addition, resource usage determinations (of, for example, wireless devices within or outside the MU-MIMO group) may be performed at defined time intervals such as every transmission-time-interval (TTI), every 10 ms, every 1 s, etc.

These and additional operations are further described with respect to the embodiments depicted in FIGS. 1-7 below.

FIG. 1 depicts an exemplary system 100 for scheduling resources in wireless networks configured to utilize massive MU-MIMO. System 100 comprises a communication network 101, gateway node(s) 102, controller node 104, access node 110, and wireless devices 120, 130, 140. Access node 110 is illustrated as deploying a sector 115, with wireless devices 120, 130, 140 being located within sector 115 and accessing network services from access node 110. Access node 110 can be any network node configured to provide communication between end-user wireless devices 120, 130, 140 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, a next generation or gigabit NodeB device (gNBs) in 5G networks, or the like. In other embodiments, access node 110 can be a small access node including a microcell access node, a picocell access node, a femtocell access node, or the like such as a home NodeB or a home eNodeB device. By virtue of comprising a plurality of antennae as further described herein, access node 110 can deploy or implement multiple-input-multiple-output (MIMO) modes, such as single user MIMO (SU-MIMO), or multi-user MIMO (MU-MIMO) modes. In an exemplary embodiment, access node 110 may utilize hundreds of antennae to simultaneously transmit each of a plurality of different data streams (such as MU-MIMO data stream 125) to a corresponding plurality of wireless devices (such as wireless devices 120). Moreover, it is noted that while access node 110 is illustrated in FIG. 1, any number of access nodes can be implemented within system 100.

In operation, access node 110 (or any other entity within system 100) may be configured to execute a method for scheduling resources, including identifying a first subset of wireless devices in a sector that are utilizing the MU-MIMO operating mode (i.e., wireless devices 120), identifying a second subset of wireless devices in the sector that are not utilizing the MU-MIMO operating mode (i.e. one or more of wireless devices 130, 140), determining that a first one or more wireless devices in the first subset of wireless devices 120 have a resource usage below a first threshold, instructing the first one or more wireless devices in the first subset of wireless devices 120 to stop utilizing the MU-MIMO operating mode, and instructing a second one or more wireless devices in the second subset of wireless devices 130, 140 to start utilizing the MU-MIMO operating mode. Instructing the second one or more wireless devices 130, 140 to start utilizing the MU-MIMO operating mode further comprises determining that the second one or more wireless devices 130, 140 have not utilized the MU-MIMO operating mode for a time threshold. Alternatively or in addition, instructing the second one or more wireless devices 130, 140 to start utilizing the MU-MIMO operating mode further comprises determining that the second one or more wireless devices 130, 140 report a signal measurement higher than reported by other wireless devices in the second subset of wireless devices 130, 140.

These identifying, determining, and instructing operations may be performed within a time period. The time period is configurable, in that it can be adjusted by an operator of system 100, or by an automated feedback mechanism. For example, the method includes adjusting the time period based on a throughput indicator of the sector 115 or of all sectors deployed by access node 110. If the throughput indicator meets a threshold, the time period is increased and, if the throughput indicator does not meet the threshold, the time period is decreased. The throughput indicator comprises any metric that indicates that there are available resources in the sector 115 (or total sectors not shown herein), or that an available throughput of the sector 115 is very good. For example, the throughput indicator comprises one or more of a total throughput, an available throughput, a resource usage, average bandwidth consumption, or any other key performance indicator (KPI). Thus, when the throughput indicator reveals that the throughput is good (by, for example, meeting a threshold), the time period for removing certain wireless devices from a MU-MIMO group 120 and adding new wireless devices to the MU-MIMO group 120 is increased. In this way, more wireless devices can take advantage of the higher downlink speeds provided by MU-MIMO.

Further, wireless devices that are newly added to the sector (such as, for example, wireless device 140) and not utilizing the MU-MIMO operating mode may be identified. For example, newly added wireless device 140 may have entered sector 115 from an adjacent sector (not shown herein) or may have been recently registered with the wireless network or resuming from an idle state. One or more of these new wireless devices 140 can be instructed to start utilizing the MU-MIMO operating mode in turn with the one or more wireless devices 130 that have not utilized MU-MIMO for a threshold time. Further, as an additional scheduling mechanism, the resources allocated towards the MU-MIMO group 120 can be balanced with a number of wireless devices that are not currently within the MU-MIMO group, such as wireless devices 130, 140. A percentage of total resources of the sector may be allocated towards wireless devices 120 utilizing the MU-MIMO operating mode. For example, downlink resources allocated towards downlink MU-MIMO stream 125 may comprise a percentage of the total resources available in sector 115, or from access node 110. A number of wireless devices not in the MU-MIMO operating mode (such as wireless devices 130, 140) may be monitored and, upon determining an increase in the number of the non MU-MIMO wireless devices, the percentage of total resources allocated towards the MU-MIMO group 120 may be reduced. Upon determining a decrease in the number of wireless devices 130, 140, the percentage may be increased.

In another exemplary embodiment, a processing node coupled to a network entity in system 100 can be configured to perform operations including obtaining a first resource usage of each of a first subset of wireless devices in sector 115 that are utilizing the MU-MIMO operating mode (i.e. wireless devices 120 receiving downlink MU-MIMO stream 125), obtaining a second resource usage of each of a second subset of wireless devices in sector 115 that are not utilizing the MU-MIMO operating mode (such as wireless devices 130, 140) and, during a time window, switching one or more wireless devices 120 with one or more wireless devices 130, 140 based on a combination of the first and second resource usage. For example, the first resource usage of each of wireless devices 120 can include a throughput of said each of wireless devices 120. In this example, switching the wireless devices further includes determining that the one or more wireless devices 120 have a throughput below a threshold throughput, and instructing such low-throughput wireless devices to stop utilizing the MU-MIMO operating mode. This creates extra resources in the form of layers or physical resource blocks (PRBs) for additional wireless devices to be added to MU-MIMO group 120. Further, the second resource usage of each of the wireless devices 130, 140 (i.e. wireless devices not in the MU-MIMO group 120) comprises a period of time during which said each of wireless devices 130, 140 has not utilized the MU-MIMO operating mode. For such wireless devices that have been "starved" or unable to access downlink MU-MIMO stream 125, these wireless devices may be instructed to start utilizing the MU-MIMO operating mode, thereby joining MU-MIMO group 120. In an exemplary embodiment, the "starving" wireless devices may be selected based on a reported signal measurement that is higher than other signal measurements reported by other wireless devices. This ensures that the wireless devices that are the most capable of taking advantage of the MU-MIMO operating mode are selected to do so.

In another exemplary embodiment, the processing node within system 100 is configured to perform operations including determining that a throughput indicator of sector 115 (or of access node 110) meets a threshold, and increasing a time window during which a first one or more wireless devices are removed from the MU-MIMO group 120 and a second one or more wireless devices are added to the MU-MIMO group 120. The first one or more wireless devices comprise any wireless device 120 that has a throughput below a threshold, and the second one or more wireless devices comprise any wireless device 130, 140 that has not been in the MU-MIMO group for a predefined time period. In this embodiment, the operations further comprise determining that the throughput indicator is below the threshold, and decreasing the time window. Further, the time window may be one of a plurality of time windows. In other words, the time window for removing wireless devices from and adding wireless devices to the MU-MIMO group 120 is repeated on a periodic basis, or as needed. In this case, the operations further comprise monitoring the throughput indicator during an interval in between each time window of the plurality of time windows. Further, one or more new wireless devices (such as, for example, wireless device 140) may be added to the MU-MIMO group 120 during the time window. In addition, resource usage determinations (of, for example, wireless devices within or outside the MU-MIMO group 120) may be performed at defined time intervals such as every transmission-time-interval (TTI), every 10 ms, every 1 s, etc.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown) using a direct link such as an X2 link or similar.

Wireless devices 120, 130, 140 may be any device, system, combination of devices, or other such communication platform capable of communicating wirelessly with access node 110 using one or more frequency bands deployed therefrom. Wireless devices 120, 130, 140 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 121, 122, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communications links 106, 107 may include S1 communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to capabilities of wireless devices 120, 130, 140, including MU-MIMO capabilities, real-time and/or historic information related to throughput of access node 110, sector 115, etc. This information may be requested by or shared with access node 110 via connections 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, controller node 104, and/or network 101.

Figure 2:
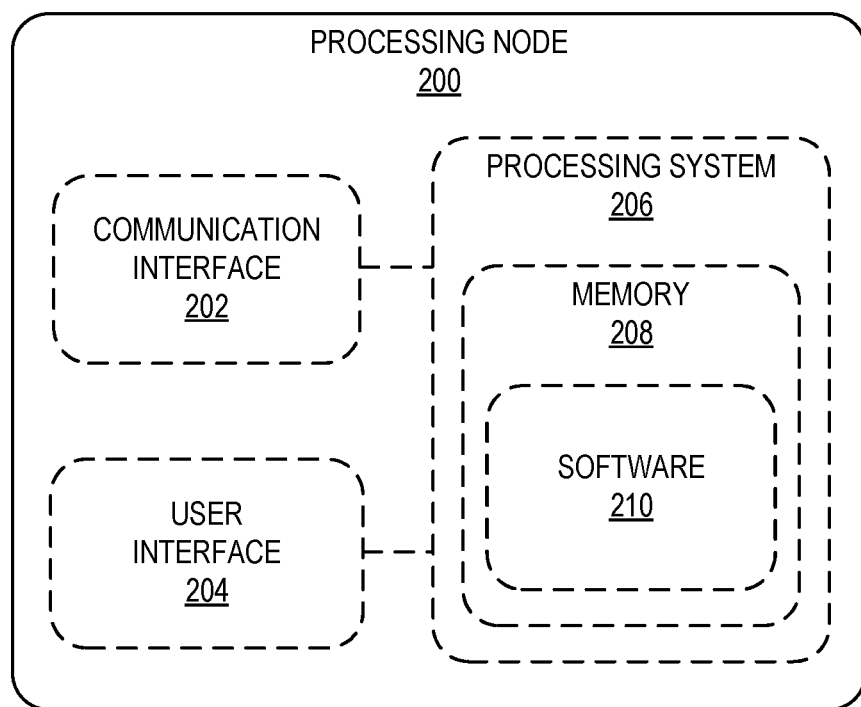
FIG. 2 depicts an exemplary processing node for scheduling resources in wireless networks configured to utilize massive MU-MIMO.

FIG. 2 depicts an exemplary processing node for scheduling resources, comprising a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. For example, software 210 may include a coherence determination module. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Figure 3:
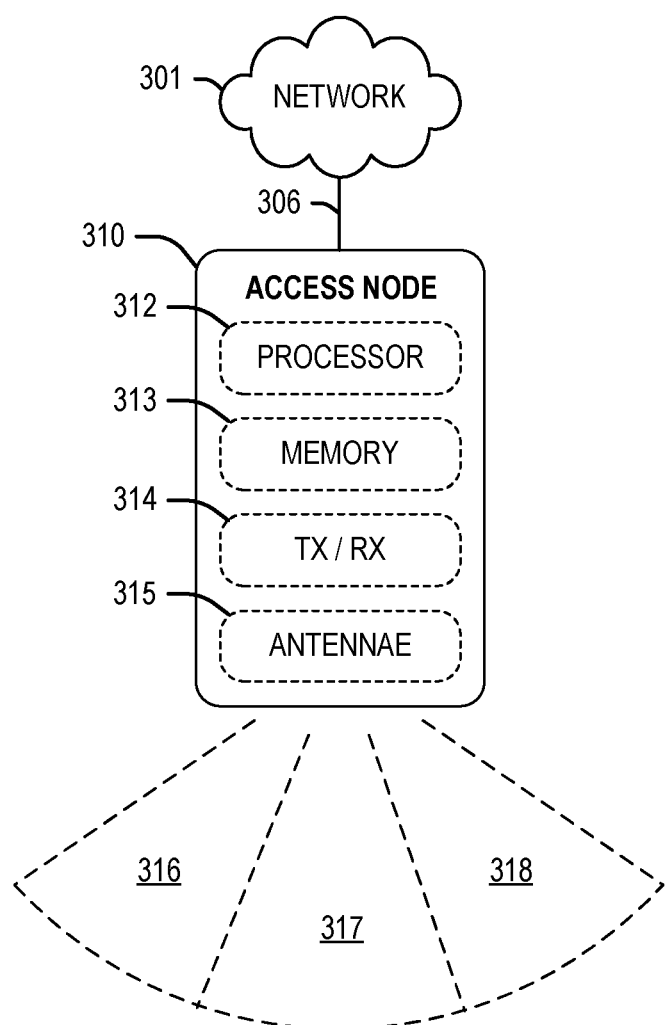
FIG. 3 depicts an exemplary access node for scheduling resources in wireless networks configured to utilize massive MU-MIMO.

FIG. 3 depicts an exemplary access node 310 for scheduling resources in wireless networks configured to utilize massive MU-MIMO. Access node 310 is configured as an access point for providing network services from network 301 to end-user wireless devices such as wireless devices 120, 130, 140 in FIG. 1. Access node 310 is illustrated as comprising a memory 313 for storing logical modules that perform operations described herein, a processor 312 for executing the logical modules, and a transceiver 314 for transmitting and receiving signals via antennae 315. Combination of antennae 315 and transceiver 314 are configured to deploy a radio air interface in one or more sectors 316, 317, 318. For example, a first plurality of antennae 315 are configured to deploy a first sector 316 (within which a corresponding MU-MIMO stream may further be deployed using techniques such as, for example, beamforming, etc.), a second plurality of antennae 315 are configured to deploy a second sector 317, and a third plurality of antennae 315 are configured to deploy a third sector 318. Although only one transceiver is depicted in access node 310, additional transceivers may be incorporated in order to deploy MU-MIMO or massive MU-MIMO data streams to end-user wireless devices in sectors 316, 317, 318, as well as to facilitate communication with other network nodes on network 301. Further, access node 310 is communicatively coupled to network 301 via communication interface 306, which may be any wired or wireless link as described above.

In operation, memory 313 comprises one or more logical modules that are executed by processor 312 to enable access node 310 to identify a first subset of wireless devices in a sector that are utilizing the MU-MIMO operating mode, identify a second subset of wireless devices in the sector that are not utilizing the MU-MIMO operating mode, determine that a first one or more wireless devices in the first subset of wireless devices have a resource usage below a first threshold, instruct the first one or more wireless devices in the first subset of wireless devices to stop utilizing the MU-MIMO operating mode, and instruct a second one or more wireless devices in the second subset of wireless devices to start utilizing the MU-MIMO operating mode. Instructing the second one or more wireless devices to start utilizing the MU-MIMO operating mode further comprises determining that the second one or more wireless devices have not utilized the MU-MIMO operating mode for a time threshold. Alternatively or in addition, instructing the second one or more wireless devices to start utilizing the MU-MIMO operating mode further comprises determining that the second one or more wireless devices report a signal measurement higher than reported by other wireless devices in the second subset of wireless devices.

These identifying, determining, and instructing operations may be performed within a time period. The time period is configurable, in that it can be adjusted by an operator of the wireless network, or by an automated feedback mechanism. For example, memory 313 may include instructions for adjusting the time period based on a throughput indicator of the sector. If the throughput indicator meets a threshold, the time period is increased and, if the throughput indicator does not meet the threshold, the time period is decreased. The throughput indicator comprises any metric that indicates that there are available resources in the sector, or that an available throughput of the sector is very good. For example, the throughput indicator comprises one or more of a total throughput, an available throughput, a resource usage, average bandwidth consumption, or any other key performance indicator (KPI). Thus, when the throughput indicator reveals that the throughput is good (by, for example, meeting a threshold), the time period for removing certain wireless devices from a MU-MIMO group and adding new wireless devices to the MU-MIMO group is increased. In this way, more wireless devices can take advantage of the higher downlink speeds provided by MU-MIMO.

Further, access node 310 can be configured to perform operations including identifying a third subset of wireless devices in the sector that are newly added to the sector and not utilizing the MU-MIMO operating mode. Newly added devices are those that have just entered the sector from an adjacent sector (deployed by the same access node or a different access node), or those wireless devices that have been recently registered with the wireless network or resuming from an idle state. One or more of these new wireless devices are instructed to start utilizing the MU-MIMO operating mode. The one or more wireless devices may be selected based on factors including but not limited to a reference signal measurement, a location, a throughput requirement, etc. Further, addition of the one or more wireless devices from the third subset (i.e. the new wireless devices) into the MU-MIMO group may be alternated with the one or more wireless devices from the second subset (i.e. those wireless devices that have not utilized MU-MIMO for a threshold time), during the time period mentioned above.

As an additional scheduling mechanism, the resources allocated towards the MU-MIMO group (i.e. wireless devices utilizing the MU-MIMO operating mode) can be balanced with a number of wireless devices that are not currently within the MU-MIMO group. For example, a percentage of total resources of the sector may be allocated towards wireless devices utilizing the MU-MIMO operating mode. Thus, memory 313 can further include instructions for monitoring a number of wireless devices in the second subset (i.e. wireless devices not utilizing the MU-MIMO operating mode) and, upon determining an increase in the number of wireless devices in the second subset, reducing the percentage of total resources allocated towards the MU-MIMO group. Upon determining a decrease in the number of wireless devices in the second subset, the percentage may be increased. Further, the resources described herein may be physical resource blocks (PRBs) within one or more subframes of a radio-air interface deployed by an access node. For example, a subframe can comprise a plurality of PRBs allocated for control information (e.g. within a control channel) and for data transmission (e.g. within a data channel).

In another exemplary embodiment, access node 310 may be part of a system for scheduling resources in a wireless network configured to utilize a multi-user multiple-input multiple-output (MU-MIMO) operating mode. In this embodiment, access node 310 may include a processing node (comprising a combination of processor 312 and memory 313), which is configured to perform operations including obtaining a first resource usage of each of a first subset of wireless devices in a sector that are utilizing a MU-MIMO operating mode (i.e. in a MU-MIMO group), obtaining a second resource usage of each of a second subset of wireless devices in the sector that are not utilizing the MU-MIMO operating mode and, during a time window, switching one or more wireless devices from the first subset with one or more wireless devices from the second subset, based on a combination of the first and second resource usage. For example, the first resource usage of each of the first subset of wireless devices comprises a throughput of said each of the first subset of wireless devices. In this example, switching the wireless devices further includes determining that the one or more wireless devices in the first subset have a throughput below a threshold throughput, and instructing the one or more wireless devices in the first subset to stop utilizing the MU-MIMO operating mode. The throughput may be based on a PRB usage, an application requirement, or any other metric associated with a resource usage of the one or more wireless devices in the first subset. Further, the second resource usage of each of the second subset of wireless devices (i.e. wireless devices not in the MU-MIMO group) comprises a period of time during which said each of the second subset of wireless devices has not utilized the MU-MIMO operating mode. In this example, the switching further includes determining that the period of time associated with the one or more wireless devices in the second subset (that is, the period of time during which said one or more wireless devices have not been in the MU-MIMO group) meets a threshold period of time, and instructing the one or more wireless devices in the second subset to start utilizing the MU-MIMO operating mode. Further, said one or more wireless devices may be instructed to start utilizing the MU-MIMO operating mode based on determining that said one or more wireless devices report a signal measurement higher than reported by other wireless devices in the second subset of wireless devices.

In another exemplary embodiment, access node 310 may be configured to perform operations including determining that a throughput indicator of a sector meets a threshold, and increasing a time window during which a first one or more wireless devices are removed from a MU-MIMO group and a second one or more wireless devices are added to the MU-MIMO group. The first one or more wireless devices comprise any wireless device that has a throughput below a threshold, and the second one or more wireless devices comprise any wireless device that has not been in the MU-MIMO group for a predefined time period. In this embodiment, the operations further comprise determining that the throughput indicator is below the threshold, and decreasing the time window. Further, the time window may be one of a plurality of time windows. In other words, the time window for removing wireless devices from and adding wireless devices to the MU-MIMO group is repeated on a periodic basis, or as needed. In this case, the operations further comprise monitoring the throughput indicator during an interval in between each time window of the plurality of time windows. Further, one or more new wireless devices may be added to the MU-MIMO group during the time window. In addition, resource usage determinations (of, for example, wireless devices within or outside the MU-MIMO group) may be performed at defined time intervals such as every transmission-time-interval (TTI), every 10 ms, every 1 s, etc.

Figure 4:
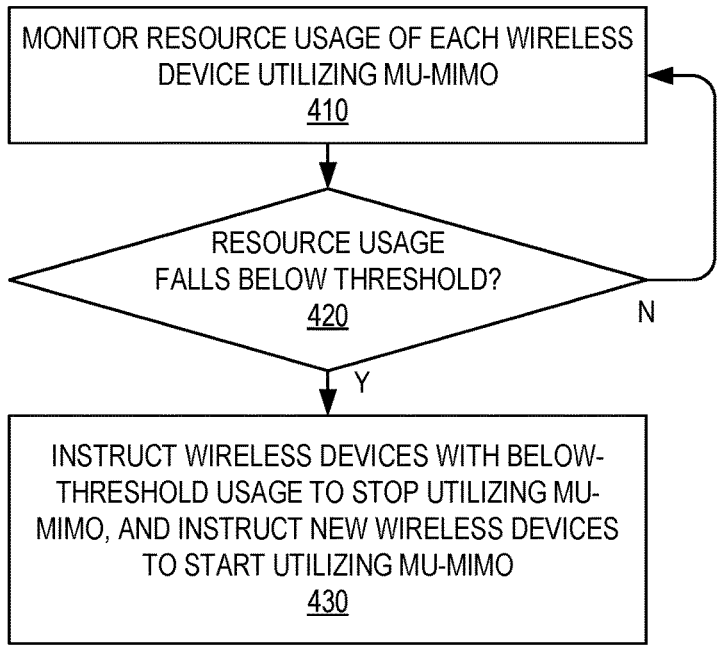
FIG. 4 depicts an exemplary method for scheduling resources in wireless networks configured to utilize massive MU-MIMO.

FIG. 4 depicts an exemplary method for scheduling resources in wireless networks configured to utilize massive MU-MIMO. The method of FIG. 4 is illustrated with respect to an access node, such as access node 110, 310. In other embodiments, the method can be implemented with any suitable network element. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, a resource usage of each wireless device utilizing MU-MIMO is monitored. For example, an access node may deploy wireless air-interface resources within a geographic area referred to as a sector, with wireless devices being located within the sector and accessing network services from the access node. The wireless devices utilizing MU-MIMO may be part of a MU-MIMO group of wireless devices within the sector, wherein each wireless device in the MU-MIMO group has access to a downlink MU-MIMO data stream, owing to some combination of the location and/or orthogonality of the wireless devices in the MU-MIMO group. Further, the resource usage may be based on a usage of physical resource blocks (PRBs) within one or more subframes of a radio-air interface utilized by the MU-MIMO data stream deployed by an access node. For example, a subframe can comprise a plurality of PRBs allocated for control information (e.g. within a control channel) and for data transmission (e.g. within a data channel).

At 420, it is determined whether or not the resource usage of the MU-MIMO wireless devices falls below a threshold. If the usage does not fall below the threshold, the method continues to monitor the resource usage at 410. However, if the resource usage falls below the threshold then, at 430, wireless devices with low MU-MIMO usage (i.e. below the threshold) are instructed to stop utilizing the MU-MIMO operating mode, and other wireless devices that are new and/or that have not utilized MU-MIMO for a threshold time period are instructed to start utilizing the MU-MIMO operating mode. In addition to any wireless device that has not utilized the MU-MIMO period for the threshold time period, new wireless devices may include wireless devices that are newly added to the sector and not utilizing the MU-MIMO operating mode. Newly added devices are those that have just entered the sector from an adjacent sector (deployed by the same access node or a different access node), or those wireless devices that have been recently registered with the wireless network or resuming from an idle state. One or more of these new wireless devices are instructed to start utilizing the MU-MIMO operating mode. The one or more wireless devices may be selected based on factors including but not limited to a reference signal measurement, a location, a throughput requirement, etc. Further, addition of the one or more newly added wireless devices may be included into the MU-MIMO group in turn with the one or more wireless devices that have not utilized MU-MIMO for a threshold time.

Further, these operations may be performed within a time window that can be adjusted based on a throughput indicator of the sector. If the throughput indicator meets a threshold, the time window is increased and, if the throughput indicator does not meet the threshold, the time window is decreased. The throughput indicator comprises any metric that indicates that there are available resources in the sector, or that an available throughput of the sector is very good. For example, the throughput indicator comprises one or more of a total throughput, an available throughput, a resource usage, average bandwidth consumption, or any other key performance indicator (KPI). Thus, when the throughput indicator reveals that the throughput is good (by, for example, meeting a threshold), the time period for removing certain wireless devices from a MU-MIMO group and adding new wireless devices to the MU-MIMO group is increased. In this way, more wireless devices can take advantage of the higher downlink speeds provided by MU-MIMO.

Figure 5:
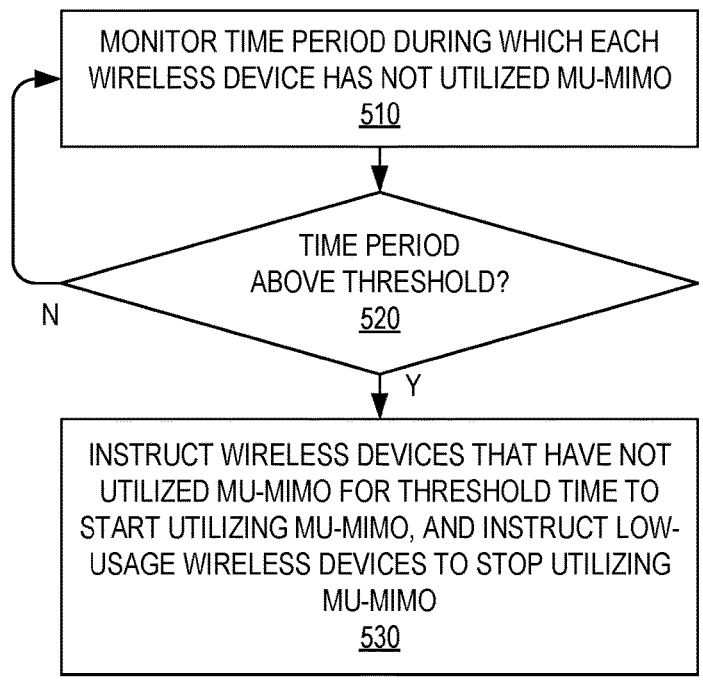
FIG. 5 depicts another exemplary method for scheduling resources in wireless networks configured to utilize massive MU-MIMO.

FIG. 5 depicts an exemplary method for scheduling resources in wireless networks configured to utilize massive MU-MIMO. The method of FIG. 5 is illustrated with respect to an access node, such as access node 110, 310. In other embodiments, the method can be implemented with any suitable network element. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, a time period is monitored during which one or more wireless devices have not utilized a MU-MIMO operating mode or accessed a MU-MIMO downlink data stream. For example, an access node may deploy wireless air-interface resources within a geographic area referred to as a sector, with wireless devices being located within the sector and accessing network services from the access node. The wireless devices utilizing MU-MIMO may be part of a MU-MIMO group of wireless devices within the sector, wherein each wireless device in the MU-MIMO group has access to a downlink MU-MIMO data stream, owing to some combination of the location and/or orthogonality of the wireless devices in the MU-MIMO group. Meanwhile, other wireless devices that are new and/or that have not utilized MU-MIMO for a threshold time period may also be present within the sector. Thus, at 520, it is determined whether or not these wireless devices have not utilized the MU-MIMO operating mode or been in the MU-MIMO group for a threshold period of time. If the wireless devices have not yet been in the MU-MIMO operating mode for the threshold time period, the method continues to monitor the time period at 510.

However, if the threshold time period is reached then, at 530, the wireless devices that have not access the MU-MIMO operating mode for the threshold time period are instructed to start utilizing the MU-MIMO operating mode. In addition to any wireless device that has not utilized the MU-MIMO period for the threshold time period, new wireless devices may include wireless devices that are newly added to the sector and not utilizing the MU-MIMO operating mode. Newly added devices are those that have just entered the sector from an adjacent sector (deployed by the same access node or a different access node), or those wireless devices that have been recently registered with the wireless network or resuming from an idle state. One or more of these new wireless devices are instructed to start utilizing the MU-MIMO operating mode. The one or more wireless devices may be selected based on factors including but not limited to a reference signal measurement, a location, a throughput requirement, etc. Further, addition of the one or more newly added wireless devices may be included into the MU-MIMO group in turn with the one or more wireless devices that have not utilized MU-MIMO for a threshold time.

Further, any wireless devices in the MU-MIMO group that have a low resource usage may be instructed to stop utilizing the MU-MIMO group, in order to make room for the newly added wireless devices. For example, the resource usage may be based on a usage of physical resource blocks (PRBs) within one or more subframes of a radio-air interface utilized by the MU-MIMO data stream deployed by an access node. For example, a subframe can comprise a plurality of PRBs allocated for control information (e.g. within a control channel) and for data transmission (e.g. within a data channel). Since a number of layers (or spatial streams) within a MU-MIMO stream is limited, removing certain devices from the MU-MIMO group enables addition of the other devices in the MU-MIMO group.

Further, these operations may be performed within a time window that can be adjusted based on a throughput indicator of the sector. If the throughput indicator meets a threshold, the time window is increased and, if the throughput indicator does not meet the threshold, the time window is decreased. The throughput indicator comprises any metric that indicates that there are available resources in the sector, or that an available throughput of the sector is very good. For example, the throughput indicator comprises one or more of a total throughput, an available throughput, a resource usage, average bandwidth consumption, or any other key performance indicator (KPI). Thus, when the throughput indicator reveals that the throughput is good (by, for example, meeting a threshold), the time period for removing certain wireless devices from a MU-MIMO group and adding new wireless devices to the MU-MIMO group is increased. In this way, more wireless devices can take advantage of the higher downlink speeds provided by MU-MIMO.

Figure 6:
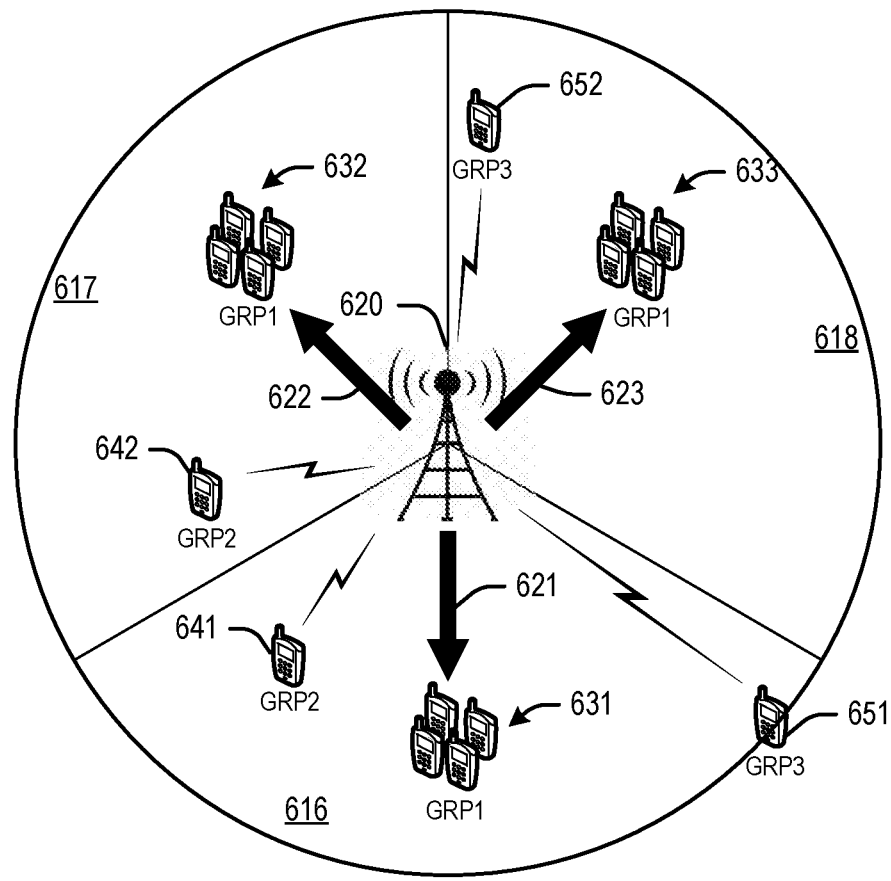
FIG. 6 depicts exemplary groupings of wireless devices within a plurality of sectors deployed by an access node configured to utilize a MU-MIMO operating mode.

FIG. 6 depicts exemplary groupings of wireless devices within a plurality of sectors deployed by an access node 610. Access node 610 is illustrated as deploying 3 sectors 616, 617, and 618. Wireless devices 631, 641, and 651 are illustrated as being located within sector 616, wireless devices 632 and 642 are illustrated as being located within sector 617, and wireless devices 633 and 652 are illustrated as being located within sector 618. Access node 610 can be any network node configured to provide communication between end-user wireless devices and a communication network such as the internet. Further, by virtue of comprising a plurality of antennae as further described herein, access node 610 can simultaneously transmit each of a plurality of different MU-MIMO data streams, such as MU-MIMO data stream 621 in sector 616, MU-MIMO data stream 622 in sector 617, and MU-MIMO data stream 623 in sector 618. Moreover, it is noted that while one MU-MIMO data stream is disclosed per sector, any number of MU-MIMO data streams and sectors in any combination can be implemented depending on a configuration of access node 610.

In operation, access node 610 may be configured to identify different "groups" or types of wireless devices, and perform scheduling operations as described herein. For example, access node 610 may be configured to identify a first subset of wireless devices in a sector that are utilizing the MU-MIMO operating mode, such as wireless devices 631 in sector 616, wireless devices 632 in sector 617, and wireless devices 633 in sector 618. Access node 610 may group these MU-MIMO wireless devices in a group, shown in FIG. 6 as GRP1 solely for illustrative purposes, with a note that any person having ordinary skill in the art could implement any system-specific grouping convention in light of this disclosure. Further, access node 610 is configured to identify a second subset of wireless devices in the sectors that are not utilizing the MU-MIMO operating mode, such as wireless devices 641, 642, identified in FIG. 6 as GRP2. Further, wireless devices 651, 652 may be newly added to the sector and may have entered their respective sector from an adjacent sector, or may have been recently registered with the wireless network or resuming from an idle state. These new wireless devices may be identified and grouped separately, as shown in FIG. 6 as GRP3.

Upon grouping these wireless devices, access node 610 may monitor a resource usage of wireless devices in GRP 1 and determine that one or more wireless devices in GRP1 have a resource usage below a first threshold. Thus, to improve an overall throughput of access node 610, these one or more low-throughput wireless devices may be instructed to stop utilizing the MU-MIMO operating mode, and a second one or more wireless devices in GRP 2 can be instructed to start utilizing the MU-MIMO operating mode. For example, one or more of wireless devices 641, 642 may have not utilized the MU-MIMO operating mode for a threshold period of time and, therefore, qualify to enter GRP1. In an exemplary embodiment (as discussed with reference to FIG. 5), the time period that these wireless devices in GRP2 are without access to MU-MIMO streams 621, 622, or 623 may be monitored and low-throughput wireless devices in GRP1 instructed to stop MU-MIMO in order to accommodate these GRP2 wireless devices. In an exemplary embodiment, the second one or more wireless devices in GRP2 are selected to enter GRP1 based on a reported signal measurement that is higher than reported by other wireless devices in the same group.

Further, a time window may be defined for switching these wireless devices between different groups, and may be adjusted based on a throughput indicator of each sector 616, 617, 618, or overall throughput of access node 620. If the throughput indicator meets a threshold, the time period is increased and, if the throughput indicator does not meet the threshold, the time period is decreased. The throughput indicator comprises any metric that indicates that there are available resources in sectors 616, 617, 618, or that an available throughput of access node 610 is above a threshold. For example, the throughput indicator comprises one or more of a total throughput, an available throughput, a resource usage, average bandwidth consumption, or any other key performance indicator (KPI). Thus, when the throughput indicator reveals that the throughput is good (by, for example, meeting a threshold), the time period for removing certain wireless devices from a MU-MIMO group (i.e. GRP1) and adding new wireless devices to the MU-MIMO group is increased. In this way, more wireless devices can take advantage of the higher downlink speeds provided by MU-MIMO.

Further, as an additional scheduling mechanism, the resources allocated towards GRP1 wireless devices (that is, a percentage of total resources allocated towards MU-MIMO streams 621, 622, 623) may be adjusted based on a number of wireless devices in one or both of GRP2 and GRP3. In other words, a number of wireless devices not in the MU-MIMO operating mode (such as wireless devices 641, 642, 651, 652) may be monitored and, upon determining an increase in the number of these non MU-MIMO wireless devices, the percentage of total resources allocated towards GRP1 wireless devices may be reduced. Upon determining a decrease in the number of wireless devices in other groups, the percentage may be increased.

Figure 7:
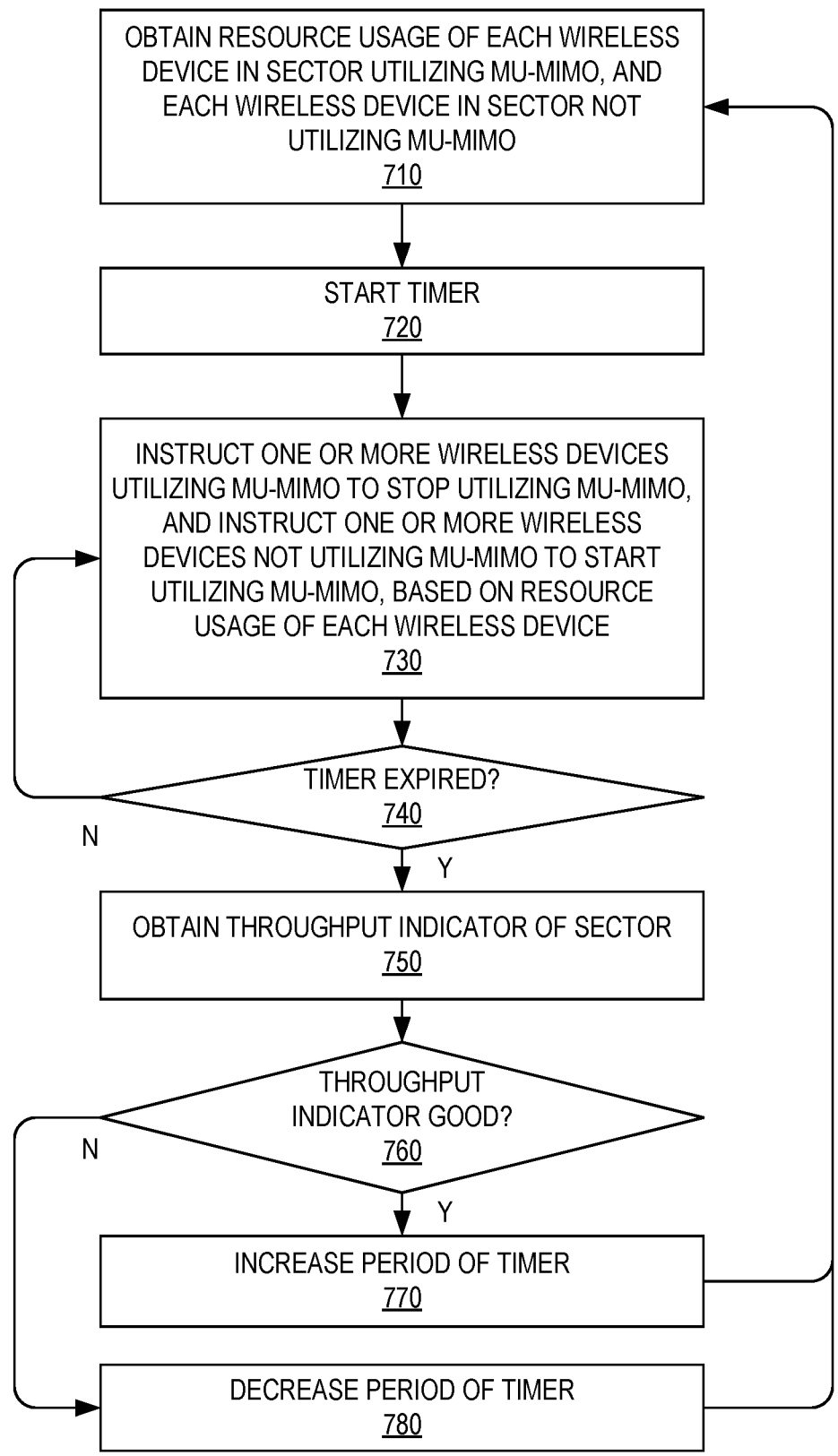
FIG. 7 depicts another exemplary method for scheduling resources in wireless networks configured to utilize massive MU-MIMO.

FIG. 7 depicts another exemplary method for scheduling resources in wireless networks configured to utilize massive MU-MIMO. The method of FIG. 7 is illustrated with respect to an access node, such as access node 110, 310, 610. In other embodiments, the method can be implemented with any suitable network element. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

The method begins at 710, with an access node (or other network node) configured to obtain a resource usage for each wireless device in one or more sectors that is utilizing MU-MIMO and that is not utilizing MU-MIMO. For example, prior to obtaining the resource usage, a first subset of wireless devices in a sector that are utilizing the MU-MIMO operating mode are identified, followed by identification of a second subset of wireless devices in the sector that are not utilizing the MU-MIMO operating mode. The resource usage may be based on a usage of physical resource blocks (PRBs) within one or more subframes of a radio-air interface utilized by the MU-MIMO data stream deployed by the access node. For example, a subframe can comprise a plurality of PRBs allocated for control information (e.g. within a control channel) and for data transmission (e.g. within a data channel).

Subsequently, a timer is started at 720. In another exemplary embodiment, the timer is started prior to determining the resource usage of the wireless devices in each operating mode (MU-MIMO activated and MU-MIMO deactivated). In either case, at 730, a first one or more wireless devices in the first subset of wireless devices that have a resource usage below a first threshold are instructed to stop utilizing the MU-MIMO operating mode, and a second one or more wireless devices in the second subset of wireless devices that have a need for resources (i.e. those wireless devices that have not utilized MU-MIMO for a threshold time period) are instructed to start utilizing the MU-MIMO operating mode. These operations have been described in detail in the previous embodiments.

At 740, it is determined whether or not the timer is expired. If the timer is not expired, the switching of wireless devices between groups based on resource usage continues at 730. However, upon expiration of the timer, an adjustment to the timer may be performed. For example, at 750, a throughput indicator of the sector is obtained. The throughput indicator comprises any metric that indicates that there are available resources in the sector, or that an available throughput of the sector is very good. For example, the throughput indicator comprises one or more of a total throughput, an available throughput, a resource usage, average bandwidth consumption, or any other key performance indicator (KPI). If the throughput indicator meets a threshold, then at 770, the time period is increased, and the method is repeated. If the throughput indicator does not meet the threshold, then at 780, the time period is decreased, and the method is repeated. Thus, when the throughput indicator reveals that the throughput is good (by, for example, meeting a threshold at 760), the time period for removing certain wireless devices from a MU-MIMO group and adding new wireless devices to the MU-MIMO group is increased. In this way, more wireless devices can take advantage of the higher downlink speeds provided by MU-MIMO.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for scheduling resources in a wireless network configured to utilize a multi-user multiple-input multiple-output (MU-MIMO) operating mode, the method comprising:
   identifying a first subset of wireless devices in a sector that are in a MU-MIMO group;

identifying a second subset of wireless devices in the sector that are not in the MU-MIMO group;

determining that a first one or more wireless devices in the first subset of wireless devices have a resource usage below a first threshold;

instructing the first one or more wireless devices in the first subset of wireless devices to leave the MU-MIMO group; and instructing a second one or more wireless devices in the second subset of wireless devices to join the MU-MIMO group, wherein the identifying, determining, and instructing operations are performed within a time period that is configurable based on a total throughput of wireless devices within the sector, the method further comprising:

increasing the time period upon determining that the total throughput meets a second threshold; and decreasing the time period upon determining that the total throughput does not meet the second threshold.

2. The method of claim 1, wherein instructing the second one or more wireless devices to join the MU-MIMO group further comprises determining that the second one or more wireless devices have not utilized the MU-MIMO operating mode for a time threshold.

3. The method of claim 1, wherein instructing the second one or more wireless devices to join the MU-MIMO group further comprises determining that the second one or more wireless devices report a signal measurement higher than reported by other wireless devices in the second subset of wireless devices.

4. The method of claim 1, further comprising:
identifying a third subset of wireless devices in the sector that are newly added to the sector and not in the MU-MIMO group; and
instructing a third one or more wireless devices in the third subset of wireless devices to join the MU-MIMO group.

5. The method of claim 4, further comprising alternating between instructing the third one or more wireless devices and the second one or more wireless devices to join the MU-MIMO group.

6. The method of claim 1, further comprising:
allocating a percentage of total resources of the sector towards wireless devices in the MU-MIMO group;
monitoring a number of wireless devices in the second subset;
upon determining an increase in the number of wireless devices in the second subset, reducing the percentage; and
upon determining a decrease in the number of wireless devices in the second subset, increasing the percentage.

7. A system for scheduling resources in a wireless network configured to utilize a multi-user multiple-input multiple-output (MU-MIMO) operating mode, the system comprising:

a processing node; and
a processor coupled to the processing node, the processor configured to perform operations comprising:
obtaining a first resource usage of each of a first subset of wireless devices in a sector that are in a MU-MIMO group;
obtaining a second resource usage of each of a second subset of wireless devices in the sector that are not in the MU-MIMO group; and
during a time window, switching one or more wireless devices from the first subset with one or more wireless devices from the second subset, based on a combination of the first and second resource usage,
wherein the time window is configurable based on a total throughput of wireless devices within the sector, the operations further comprising:
increasing the time period upon determining that the total throughput meets a second threshold; and
decreasing the time period upon determining that the total throughput does not meet the second threshold.

8. The system of claim 7, wherein the first resource usage of each of the first subset of wireless devices comprises a throughput of said each of the first subset of wireless devices.

9. The system of claim 8, wherein the switching further comprises:
determining that the one or more wireless devices in the first subset have a throughput below a threshold throughput; and
instructing the one or more wireless devices in the first subset to leave the MU-MIMO group.

10. The system of claim 7, wherein the second resource usage of each of the second subset of wireless devices comprises a period of time during which said each of the second subset of wireless devices has not been in the MU-MIMO group.

11. The system of claim 10, wherein the switching further comprises:
determining that the period of time associated with the one or more wireless devices in the second subset meets a threshold period of time; and
instructing the one or more wireless devices in the second subset to join the MU-MIMO group.

* * * * *